United States Patent [19]
Seshan et al.

[11] Patent Number: 5,989,457
[45] Date of Patent: *Nov. 23, 1999

[54] PROCESS FOR THE PRODUCTION OF SYNTHESIS GAS

[75] Inventors: Kulathu-Iyer Seshan, AJ Hengelo, Netherlands; Julian Richard H. Ross, Limerick, Ireland; Patrick Dennis L. Mercera, LD Enschede; Erzeng Xue, ZW Enschede, both of Netherlands

[73] Assignee: Mannesmann Aktiengesellschaft & K.T.I. Group B.V., Düsseldorf Germany & AB Zoetermeer, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/537,791

[22] PCT Filed: Apr. 20, 1994

[86] PCT No.: PCT/DE94/00513

§ 371 Date: Jan. 24, 1996

§ 102(e) Date: Jan. 24, 1996

[87] PCT Pub. No.: WO94/24042

PCT Pub. Date: Oct. 27, 1994

[30] Foreign Application Priority Data

Apr. 22, 1993 [DE] Germany ............... 43 13 673

[51] Int. Cl.⁶ ..................................................... C07C 1/02
[52] U.S. Cl. ..................... 252/373; 502/337; 502/325; 502/349
[58] Field of Search ................... 502/337, 325, 502/349; 252/373

[56] References Cited

U.S. PATENT DOCUMENTS

| | | | |
|---|---|---|---|
| 3,830,752 | 8/1974 | Mickelson et al. | 252/435 |
| 4,065,544 | 12/1977 | Hamling et al. | 423/252 |
| 4,255,288 | 3/1981 | Cull et al. | 252/455 |
| 4,729,981 | 3/1988 | Kobylinski et al. | 502/259 |
| 4,743,576 | 5/1988 | Schneider et al. | 502/242 |
| 4,751,005 | 6/1988 | Mitsui et al. | 210/759 |
| 5,015,617 | 5/1991 | Ohata et al. | 502/304 |
| 5,061,464 | 10/1991 | Cordonna, Jr. et al. | 423/213.5 |
| 5,075,277 | 12/1991 | Saiai et al. | 502/333 |
| 5,217,938 | 6/1993 | Reinalda et al. | 502/325 |
| 5,275,997 | 1/1994 | Ganguli et al. | 502/304 |
| 5,395,813 | 3/1995 | Clavenna et al. | 502/335 |
| 5,422,327 | 6/1995 | Soled et al. | 502/242 |
| 5,476,877 | 12/1995 | Clavenna et al. | 518/703 |
| 5,500,149 | 3/1996 | Green et al. | 252/373 |
| 5,510,056 | 4/1996 | Jacobs et al. | 252/373 |
| 5,607,892 | 3/1997 | Chopin et al. | 502/304 |
| 5,741,440 | 4/1998 | Cooper et al. | 252/373 |

*Primary Examiner*—Walter D. Griffin
*Assistant Examiner*—Nadine Preisch
*Attorney, Agent, or Firm*—Cohen, Pontani, Lieberman & Pavane

[57] ABSTRACT

A catalyst for the production of synthesis gas (CO and $H_2$) by reaction of $CO_2$ and $CH_4$ and/or other light hydrocarbons, having a support material with at least 80 wt. % $ZrO_2$ of oxides selected from the group of Y, La, Al, Ca, Ce and Si, as well as of a coating with metals of Group VIII which is applied physically by adsorption.

7 Claims, 3 Drawing Sheets

PROCESS FOR THE PRODUCTION OF SYNTHESIS GAS

BACKGROUND OF THE INVENTION

1. Field of the Invention

The present invention relates to a catalyst for the production of synthesis gas in the form of CO and $H_2$ from $CO_2$ and $CH_4$ and/or other light hydrocarbons.

2. Description of the Related Art

The combustion of fossil fuels in the form of coal, petroleum or natural gas or of secondary fuels produced therefrom which is effected predominantly in the industrialized countries is leading to an increased concentration of $CO_2$ in the atmosphere. Since $CO_2$ is one of the so-called greenhouse gases, even relatively slight increases in concentration lead to traumatic changes which have their effect throughout the world. An increase of the average temperature in the atmosphere has already been observed and a further increase is expected in the coming years, resulting in more frequent and more violent natural catastrophes (for instance periods of drought, flood, storm). Therefore, increased efforts are required to at least reduce the tempo of the further increase in the concentration of $CO_2$. It is being attempted to achieve this primarily by decreasing the consumption of energy. To achieve this, some countries have thought, for instance, of introducing an energy tax, the amount of which is based on the amount of $CO_2$ liberated upon the consumption of energy. Another possible manner of reducing the liberation of $CO_2$ is to reuse this gas for instance, for the production of other products.

Synthesis gas ($CO+H_2$) is used in a number of chemical processes. Such synthesis gas can be produced in different ways. The method most used consists of the reforming of methane. This leads to a product having an $H_2/CO$ ratio of 3 in accordance with the reaction:

$$CH_4 + H_2O \rightarrow CO + 3H_2$$

The $H_2/CO$ ratio can be shifted further to even higher values by increasing the amount of $H_2O$ relative to the amount of $CH_4$, followed by a CO-shift reaction:

$$CO + H_2O \rightarrow CO_2 + H_2$$

A synthesis gas produced in this manner is particularly suitable for the synthesis of methanol, which in its turn can be further converted into other petrochemical products.

The partial oxidation of methane with oxygen represents another method for the production of synthesis gas and is characterized by a $H_2/CO$ ratio of 2:

$$CH_4 + 0.5\, O_2 \rightarrow CO + 2H_2$$

Such a synthesis gas is particularly suitable for the Fischer-Tropsch synthesis, which requires an $H_2/CO$ ratio of about 1.7–2.5.

The production of oxoalcohols is another important field of use of synthesis gas. Oxoalcohols are produced by hydroforming α-olefins in accordance with the reaction:

$$CH_3-CH_2-CH_2-CH=CH_2+CO+H_2 \rightarrow CH_3-CH_2-CH_2-CH_2-CH_2-CHO$$

The aldehyde is then hydrogenated to form the desired alcohol. In this production process an $H_2/CO$ ratio of about 1 is required. One possibility for producing such a synthesis gas is afforded by the gasification of coal.

Another possibility of producing such a synthesis gas having an $H_2/CO$ ratio of 1 is the reaction of $CO_2$ with $CH_2$:

$$CO_2 + CH_4 \rightarrow 2CO + 2H_2$$

It is known to effect this reaction at, for instance, 500° C. under increased pressure in the presence of a catalyst. Since such processes have not acquired any practical importance up to now, there are relatively few publications on this subject (for instance, *Chem. Eng. Science* 1988, No. 11, pages 3049–3062, and *Chem. Eng. Science* 1989, No. 12, pages 2825–2829). As suitable catalysts the metals Ni, Pt, Rh and Pd are mentioned, these elements being applied in each case to a support material which consists of $Al_2O_3$ or $SiO_2$. The effectiveness in principle of such catalysts can easily be shown in a laboratory test. However, they are unsuitable for commercial use. This is due to the fact that undesired side reactions are also promoted by the action of the catalyst, namely:

$$2CO \rightarrow C + CO_2 \text{ (Boudouard reaction)}$$

$$CH_4 \rightarrow C + 2H_2 \text{ (methane cracking)}$$

$$CO + H_2 \rightarrow C + H_2O \text{ (CO reduction)}$$

These side reactions are undesired, since they lead to the formation of free carbon which deposits on the catalyst (coking) and reduces the activity thereof more and more (deactivation). The coking can, to be sure, be reduced by a drastic increase in the amount of $CO_2$ beyond the amount stoichiometrically necessary for the amount of $CH_4$ used, but this, of course, results in the need to separate large amounts of excess $CO_2$ from the synthesis gas produced and return it to the process. The economy of such a process is placed in question by the additional expense necessary for this.

In order to reduce the tendency towards coking, it is known to permit the reaction between $CO_2$ and $CH_4$ to take place in the presence of steam. This also impairs the economy of the process, without giving results which are truly technically satisfactory.

In Federal Republic of Germany 41 02 185 A1, a catalytic system for the production of synthesis gas by the reforming of light hydrocarbons with $CO_2$ is described in which a metal or a compound of metals of the platinum group is provided as catalytically active coating substance. The preferred metals are rhodium, ruthenium and iridium. These metals are applied to an oxidic support material which is selected from the group consisting of Al, Mg, Zr, Si, Ce and/or La. The examples of embodiments are limited to two support materials $MgO_2$ and $Al_2O_3$. Before the application of the coating material to the support material, the support material is silicified in a prior treatment. Upon the application of the coating material itself, a chemical reaction of the materials used takes place in the form of a heterogeneous solid-liquid reaction, in connection with which a CO atmosphere or an inert atmosphere must be maintained. Thereupon, the material which is obtained in this manner is dried and calcined in a known manner. By the special manner of production of this catalytic system, the tendency towards coking is to be substantially reduced.

SUMMARY OF THE INVENTION

The object of the invention is to find a catalyst which is not only sufficiently active to obtain a high yield of CO and $H_2$ but which, in particular, avoids impermissibly strong coking for sufficiently long periods of time and thus remains sufficiently active for a long period of time, even if the amounts of $CO_2$ and $CH_4$ used are relatively close to the stoichiometric values and the $CO_2/CH_4$ ratio (molecular weights) is therefore equal to about 1. It should be possible to dispense, as far as possible, with the use of steam during the reaction.

A catalyst of Ni (5% by weight) which was applied to a γ-$Al_2O_3$ support material showed in experiments an excellent catalytic action which led to conversion rates in the vicinity of the thermodynamic equilibrium values at the corresponding temperature. At a reaction temperature of, for instance, 500° C., the catalyst, however, was deactivated by coking within a very short period of time. On the other hand, a corresponding Ni catalyst having a base of γ-$Al_2O_3$ while it did not exhibit any substantial coking, was, however, substantially less active, since it permitted only conversion rates with the range of 20% of the amounts corresponding to the thermodynamic equilibrium at the corresponding temperature. Good results with respect to its activity were again produced by a catalyst of Pt (2% by weight) which was also applied to an $Al_2O_3$ matrix. The conversion rate for $CH_4$ was, to be sure, very high, namely 90% with a reaction temperature of 650° C. (in the literature, a conversion rate of 100% is indicated for a temperature of 850° C. (see A. T. Ashcroft, A. K. Cheetham, M. L. H. Green, P. D. F. Vernon: "Partial oxidation of methane to synthesis gas using carbon dioxide," Nature 352, Jul. 18, 1991), but after only 8 hours of use a deactivation of the catalyst was noted. The same applies also to catalysts having a base of an $SiO_2$ matrix.

It was therefore entirely surprising that, in experiments, the excellent suitability in particular of Ni and Pt catalysts on the base of thermally stabilized $ZrO_2$ matrix material could be noted. These catalysts not only gave satisfactory activity values but at the same time they were characterized also by long-term resistance to deactivation by coking, without the use of steam being necessary. Thus, a 5% Ni/$ZrO_2$ catalyst permitted a $CH_4$ conversion rate of about 50% of the thermodynamic weight equilibrium values at the corresponding temperature and did not exhibit any substantial coking for a long period of time at 500° C. Even clearly better $CH_4$ conversion rates, lying close to the thermodynamic equilibrium values (for instance 90% at 650° C.) were obtained for a 2% Pt/$ZrO_2$ fixed-bed catalyst, the $CO_2$ conversion rate was 55% and the selectivity for CO was 100%. No visible coking could be noted even after 100 hours of operation.

The invention has shown that, in particular, Pt and Ni catalysts on a thermally stabilized support material consisting predominantly of $ZrO_2$ (at least 80 wt. % and preferably 90 wt. %) not only give good activity values but, at the same time, also show excellent resistance to deactivation by coking. The percentage by weight of the coating can be limited to maximum 7%. In the case of Pt catalysts, the coating should constitute a percentage by weight of 0.1 to 5%, and preferably 0.1 to 2.0%. For Ni catalysts, the percentage by weight is preferably 0.5–5.0%. Several catalyst materials (also other elements of groups VIII of the periodic system, for instance Pd, Co) can also be applied onto the support material. Further, 0.1–2.0 wt. % Pt in combination with 2–5 wt. % Ni are particularly suitable. A combination of Pt and Pd is also advantageous.

The use of a support material which consists predominantly of $ZrO_2$ is of decisive importance for the invention. Chemically pure $ZrO_2$, however, exhibits an undesired strong inclination towards sintering at temperatures above 600° C. The support material is therefore thermally stabilized by admixture of 0.5–10 mol % of accompanying substances in the form of one or more oxides of the elements Y, La, Ce, Si, Ca or Al, i.e. its tendency to sinter is reduced at the intended temperatures of use. Surprisingly, due to the presence of Y, La, or Ce in the support material, the activity of the catalyst is furthermore improved.

DESCRIPTION OF THE PREFERRED EMBODIMENTS

The catalyst of the invention is produced by calcinating the $ZrO_2$ at a suitable temperature up to about 670° C. and then mixing it with the thermal stabilizer (for instance $Y_2O_3$) in order to obtain the support material. The application of the catalytically active coating substance is effected purely physically by the known dry-impregnation method or the wet-impregnation method. In this connection, adsorption of the coating substance, present as a complex compound in a solvent, takes place on the support material. The solvent is then evaporated using any suitable means (for instance by thermal drying under a vacuum). The catalyst material thus obtained is then again calcined at a temperature not great than about 800° C.

The production of CO/$H_2$-synthesis gas with the use of a catalyst in accordance with the invention is effected at temperatures of between about 400 and about 900° C., and preferably between about 700 and 800° C. The pressure upon the reaction can be between about 1 and about 30 bar and is preferably between about 10 and 20 bar. The amounts of $CO_2$ and $CH_4$ used should be so adapted to each other that the molar weight ratio of $CO_2$ to $CH_4$ is generally between about 0.5 and 4, more specifically between 0.5 and 1.5, and particularly preferred the value 1. The use of steam for reducing the tendency to coking is not necessary.

The invention will be further explained on basis of the following examples. Reference is had therein, as criteria of activity, to the conversion rates for $CO_2$ and $CH_4$, as well as the CO yield and CO selectivity. These values are defined as follows:

$$CO_2 \text{ Conversion Rate} = \left(\frac{\text{mol } CO_2 \text{ in the product}}{\text{mol } CO_2 \text{ in the feed}}\right) \times 100\%$$

$$CO_2 \text{ Conversion Rate} = \left(\frac{\text{mol } CH_4 \text{ in the product}}{\text{mol } CH_4 \text{ in the feed}}\right) \times 100\%$$

$$CO \text{ Selectivity} = \frac{\text{mol CO in product}}{\text{mol all C-cont'ng portions in the product}} \times 100\%$$

$$CO \text{ Yield} = \left(1 - \frac{\text{mol } CH_4 + \text{mol } CO_2 \text{ in product}}{\text{mol } CH_4 + \text{mol } CO_2 \text{ in the}}\right) \times CO \text{ Selectivity } \%$$

First of all, it may be pointed out that, in the following measurement results, the conversion rates for $CO_2$ and $CH_4$ under the different conditions are not in a ratio of 1:1 as would be expected purely mathematically on the basis of the $CO_2$/$CH_4$ reaction equation. This is due to the fact that, in addition, the following side reaction also takes place, which, to be sure, does not lead to coking but increases the amount of $CO_2$ converted in favor of the CO:

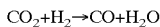

Figure 1:
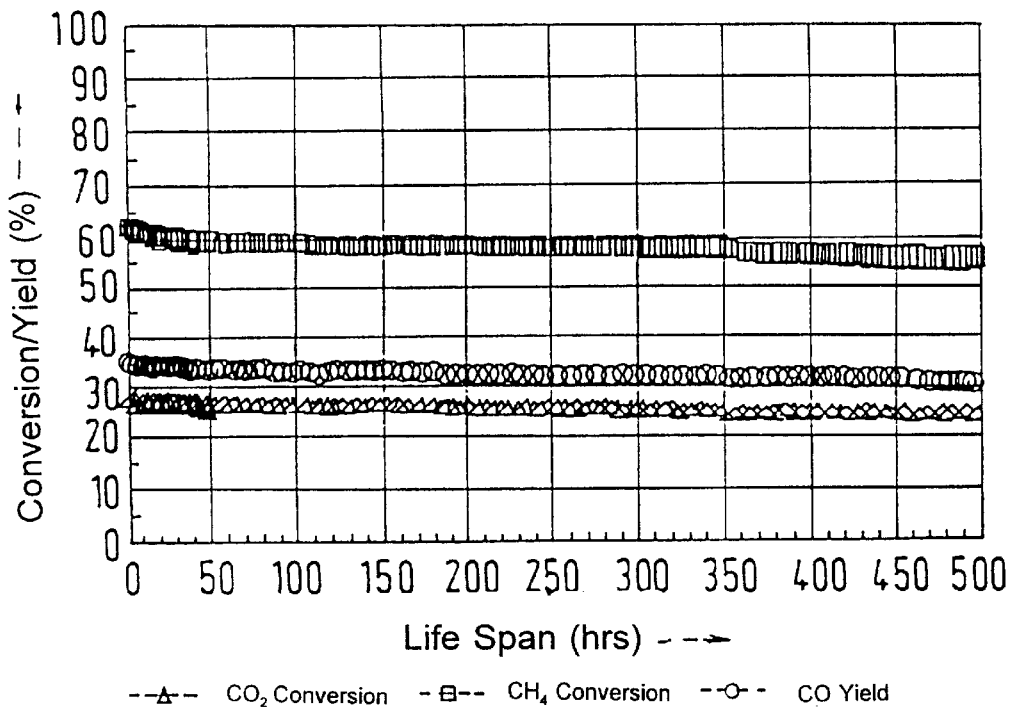
FIG. 1 is a graph showing the conversion rates of $CO_2$ $CH_4$ and CO over a specific period of time using one of the catalysts embodied in the present invention.
Figure 2:
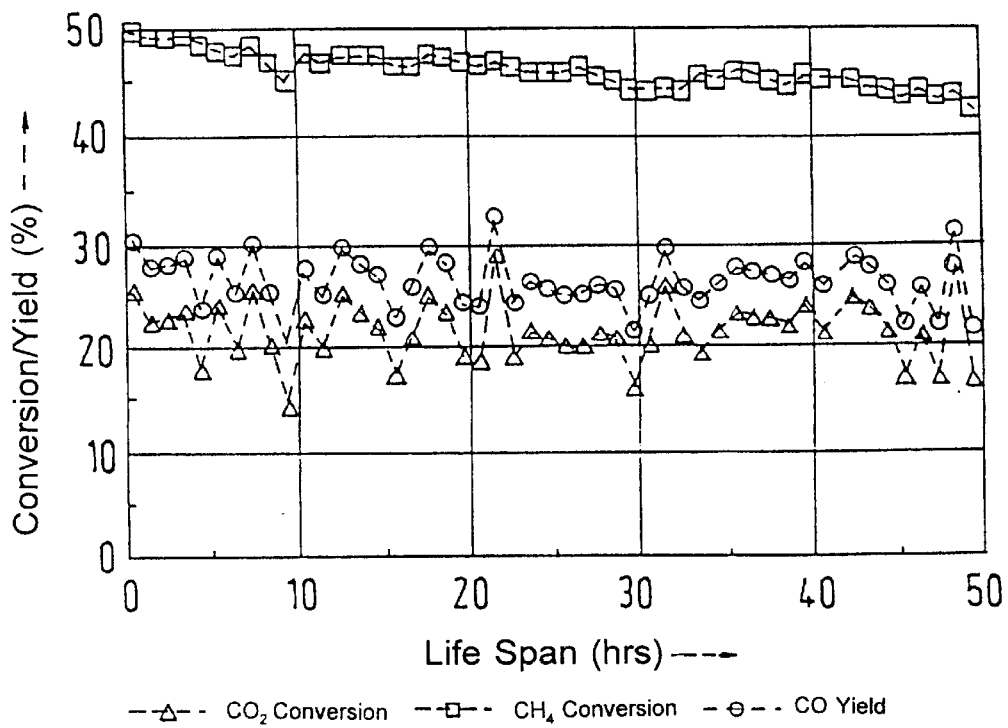
FIG. 2 is a graph showing the conversion rates of $CO_2$, $CH_4$ and CO over a specific period of time using another one of the catalysts.
Figure 3:
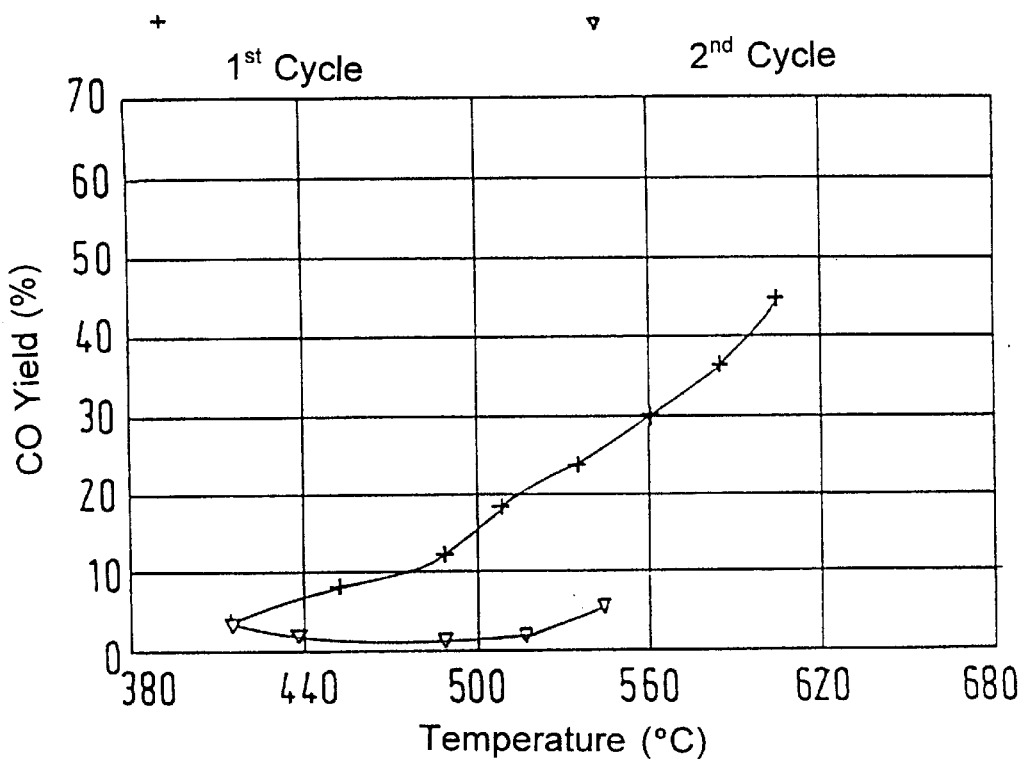
FIG. 3 is a graph showing the conversion rate of CO as a function of temperature using a traditional catalyst.
Figure 4:
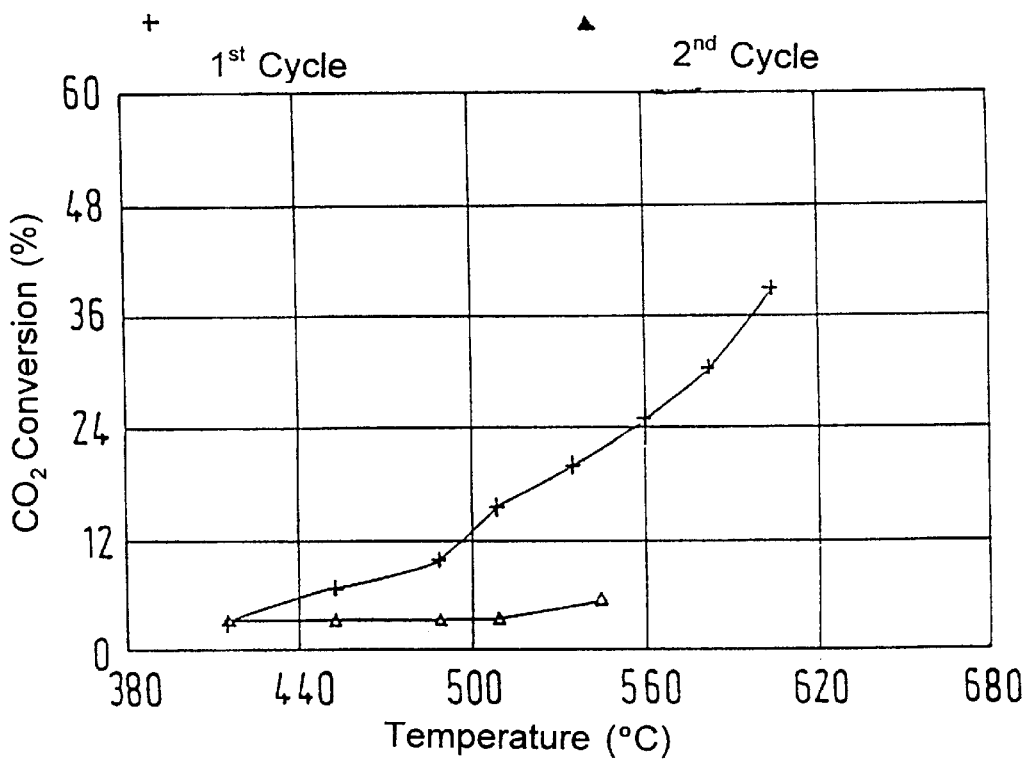
FIG. 4 is a graph showing the conversion rate of $CO_2$ as a function of temperature using a traditional catalyst.
Figure 5:
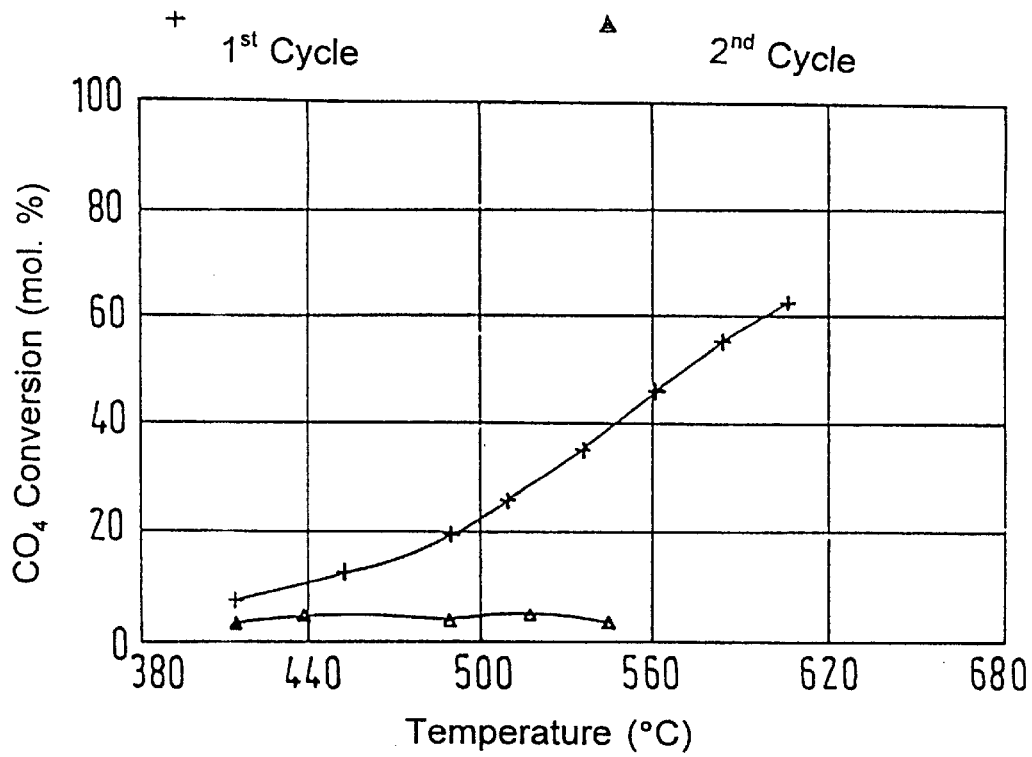
FIG. 5 is a graph showing the conversion rate of $CH_4$ as a function of temperature using a traditional catalyst.
Figure 6:
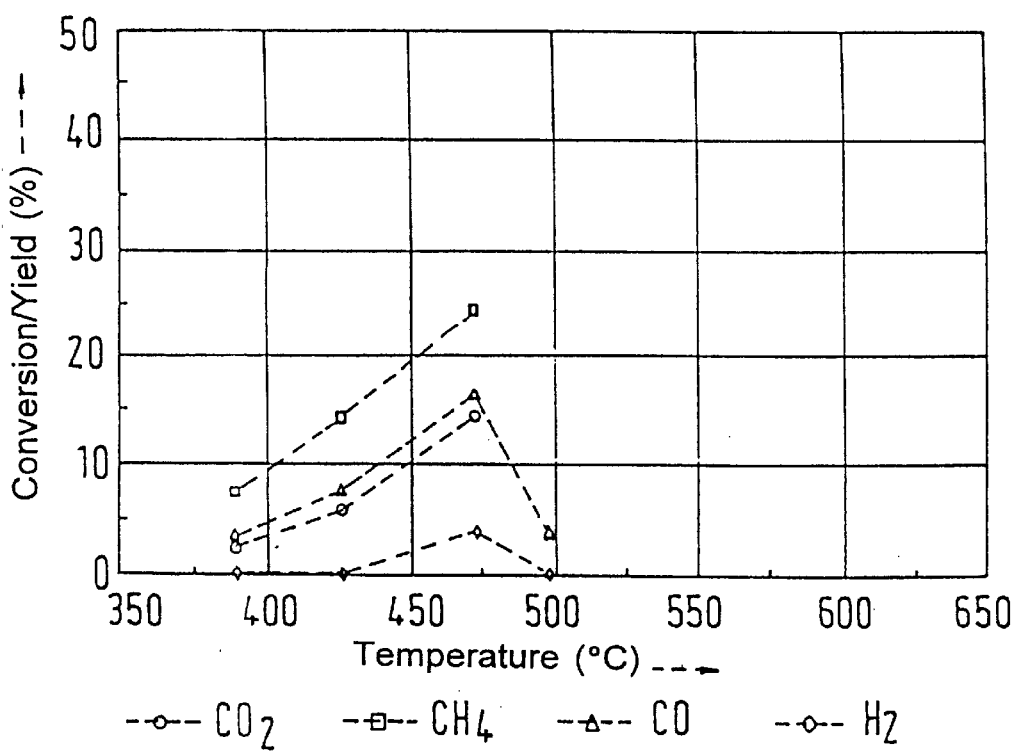
FIG. 6 is a graph showing the results for $CO_2$ and $CH_4$ conversion rates and the CO yield for a first temperature cycle.

FIGS. 1 to 6 graphically show conversion rates for $CO_2$ and $CH_4$ as well as the CO yield under different experimental conditions.

EXAMPLE 1

A catalyst was prepared in accordance with the wet impregnation (incipient wetness) method. For this purpose, 5 g of monoclinic $ZrO_2$ were calcined at 650° C. for 15 hours in air, thermally stabilized, compacted to form pellets, and then comminuted into grains having a particle size of 0.3–0.6 mm. This material had a BET surface of 33 m²/g and a pore volume of 0.17 cm³/g. The material was then treated with 5 cc of an aqueous $H_2PtCl_4 \times H_2O$ solution (0.02 g Pt/cm³) in a rotary evaporator at 50° C. Thereupon the catalyst was dried for 4 hours at 110° C. and then calcined for 15 hours at 650° C.

In a series of tests, 300 mg (0.8 cm³) of the granular catalyst were examined using a flow of gas of 170 cm³/min in a temperature range of about 400–620° C. The gas had a $CH_4/CO_2$ ratio of 1:3.9 and flowed through the fixed-bed catalyst in an upward direction. The composition of the resultant product was examined in the same way as in the following examples in a gas chromatograph with activated carbon column. This gave the measurement values set forth in Table 1. Above 560° C., excellent conversion rates are obtained for $CH_4$. It is to be noted that the selectivity for CO was practically 100%. This effect can be noted indirectly also from FIG. 1 which shows, for the temperature of 511° C., the change of the conversion rates of $CO_2$ and $CH_4$ as well as the CO yield over a long period of time. It can be clearly noted that the effectiveness of the catalyst itself is still at a very high value even after 500 hours of operation. For example, the conversion rate for $CH_4$ decreases merely from about 62% at the start to about 57%. This means that coking has remained extremely slight.

EXAMPLE 2

A Pt catalyst which had $ZrO_2$—$Y_2O_3$ as support material, the $ZrO_2$ containing 3 mol % $Y_2O_3$, was produced in the same manner as in Example 1. This catalyst was again tested under conditions similar to those employed in Example 1 and it gave the results set forth in Table 2. In particular, at temperatures above 560° C., even somewhat better values than in the first example were obtained here with respect to the $CO_2$ conversion rate and the CO yield.

TABLE 1

| Temperature °C. | 398 | 432 | 473 | 492 | 511 | 529 | 546 | 565 | 611 | 620 |
|---|---|---|---|---|---|---|---|---|---|---|
| $CO_2$ Conv. (%) | 2.07 | 3.71 | 7.55 | 9.21 | 11.33 | 14.36 | 17.56 | 20.29 | 27.76 | 29.64 |
| CH4 Conv. (%) | 3.11 | 5.67 | 13.98 | 18.54 | 23.27 | 29.04 | 35.90 | 42.74 | 61.65 | 66.70 |
| CO (%) | 2.28 | 4.11 | 8.87 | 11.59 | 13.78 | 17.34 | 21.30 | 24.87 | 34.68 | 37.36 |

TABLE 2

| Temperature °C. | 408 | 444 | 470 | 498 | 524 | 553 | 572 | 596 |
|---|---|---|---|---|---|---|---|---|
| $CO_2$ Conv. (%) | 4.05 | 4.36 | 6.27 | 7.80 | 11.89 | 17.92 | 23.04 | 28.50 |
| $CH_4$ Conv. (%) | 6.65 | 7.38 | 9.30 | 17.49 | 23.05 | 30.04 | 39.16 | 49.14 |
| CO (%) | 4.67 | 5.54 | 6.53 | 10.12 | 14.56 | 20.82 | 26.90 | 33.44 |

EXAMPLE 3

In the same way as in Example 1, a Pt catalyst was prepared which had $ZrO_2$—$La_2O_3$ as the support material, the $ZrO_2$ containing 3 mol % $La_2O_3$. This catalyst was again tested under conditions similar to those in Example 1 and gave the results set forth in Table 3. This catalyst gave values which were even clearly better than the catalyst in the first example in all temperature ranges, with respect both to the $CO_2$ conversion rate and to the $CH_4$ conversion rate and the CO yield.

EXAMPLE 4

In a further test, the conditions of the first example were modified so that the material used had a $CH_4/CO_2$ ratio of 1:2.16. Since in this connection the $CH_4$ percentage in the material used was greater, this necessarily had to lead to a corresponding reduction of the $CH_4$ conversion rate. The decisive factor is however that the $CO_2$ conversion rate and also the CO yield lie clearly above the corresponding values of Example 1, as the measurement values set forth in Table 4 show.

TABLE 3

| Temperature °C. | 402 | 402 | 440 | 475 | 506 | 525 | 562 | 590 | 613 |
|---|---|---|---|---|---|---|---|---|---|
| $CO_2$ Conv. (%) | 5.18 | 4.23 | 9.85 | 15.59 | 19.78 | 25.23 | 30.52 | 36.53 | 40.49 |
| $CH_4$ Conv. (%) | 7.19 | 8.14 | 13.71 | 22.27 | 31.05 | 40.91 | 51.32 | 62.91 | 70.34 |
| CO (%) | 5.65 | 5.13 | 10.74 | 17.14 | 22.39 | 28.86 | 35.33 | 42.64 | 47.40 |

TABLE 4

| Temperature °C. | 399 | 432 | 473 | 491 | 506 | 529 | 547 | 561 |
|---|---|---|---|---|---|---|---|---|
| $CO_2$ Conv. (%) | 2.53 | 5.80 | 9.22 | 11.78 | 14.47 | 17.76 | 20.54 | 23.68 |
| $CH_4$ Conv. (%) | 2.37 | 5.87 | 10.23 | 13.34 | 16.67 | 20.93 | 25.41 | 29.36 |
| CO (%) | 2.45 | 5.83 | 9.54 | 12.28 | 15.18 | 18.77 | 22.09 | 25.64 |

EXAMPLE 5

In Table 5 there can be noted the experimental results which were ascertained for the catalyst of Example 1 for a feed material having a $CH_4/CO_2$ ratio of 1:1.09, which corresponds practically to the stoichiometric ratio. The values of the $CH_4$ conversion rate and of the CO yield are again better than in Example 4.

EXAMPLE 6

Another catalyst was prepared by the dry impregnation method. For this purpose, 4 g of monoclinic $ZrO_2$ were calcined in air at 650° C. for 15 hours, thermally stabilized, compacted to form pellets, and then comminuted to form grains having a particle size of 0.3–0.6 mm. This material had a BET surface of 33 $m^2/g$ and a pore volume of 0.17 $cm^3/g$. The material was then treated with 1.74 cc of an aqueous $Ni(NO_3)_2 \times H_2O$ solution (2 $mol/dm^3$) in a rotary evaporator at 60° C. The catalyst was then dried for 4 hours at 120° C. and thereupon calcined for a further 19 hours at 650° C.

In this way a granular 5 wt. % $Ni/ZrO_2$ catalyst was obtained, 300 mg (0.8 $cm^3$) of which were examined with a flow of feed gas of 170 $cm^3/min$ in a temperature range of about 400–620° C. The feed gas had a $CH_4/CO_2$ ratio of 1:3.9 and flowed through the fixed-bed catalyst in an upward direction. The composition of the resultant product was examined in a

TABLE 5

| Temperature °C. | 397 | 432 | 467 | 488 | 503 | 520 | 538 | 555 | 596 |
|---|---|---|---|---|---|---|---|---|---|
| $CO_2$ Conv. (%) | 3.67 | 6.45 | 13.23 | 16.65 | 19.78 | 22.39 | 27.54 | 31.84 | 45.8 |
| $CH_4$ Conv. (%) | 1.79 | 3.23 | 7.97 | 10.41 | 12.74 | 14.80 | 18.68 | 22.19 | 34.7 |
| CO (%) | 2.77 | 4.90 | 10.71 | 13.66 | 16.41 | 18.75 | 23.29 | 27.21 | 40.5 | gas chromatograph with an activated carbon column. This gave the measurement values set forth in Table 6. Up to temperatures within the range of about 540–550° C., this catalyst, as shown by a comparison with Table 4, is slightly superior in its activity to that of the first example. At higher temperatures, the conditions, however, reverse. A useful life under the above-indicated conditions with a test temperature of 601° C. gave the results shown in FIG. 2. The conversion rates for $CO_2$ and $CH_4$ obtained, as well as the CO yield, decreased, to be sure, with increasing time of use, but still had very high values even after 50 hours of operation. This means that, also in this case, no substantial coking could be noted and the selectivity for CO was almost 100%.

EXAMPLE 7

The catalyst of Example 6 was examined under the condition that the $CH_4/CO_2$ ratio in the feed gas was 1:1.09. In this case, as can be noted from Table 7, the catalyst showed, in comparison with Table 6, up to about 460° C., better results than previously shown. To be sure, with even higher temperatures, disturbing coking phenomena occurred. This effect could be avoided almost completely in the case of the $Pt—ZrO_2$ catalyst. It is also to be noted here that, despite this coking which could be noted,

TABLE 6

| Temperature °C. | 400 | 433 | 475 | 493 | 513 | 531 | 554 | 475 | 616 |
|---|---|---|---|---|---|---|---|---|---|
| $CO_2$ Conv. (%) | 2.85 | 6.23 | 8.33 | 11.07 | 13.78 | 16.23 | 18.13 | 20.84 | 25.89 |
| $CH_4$ Conv. (%) | 7.55 | 11.23 | 17.84 | 22.84 | 27.68 | 32.46 | 37.20 | 43.44 | 58.12 |
| CO (%) | 3.84 | 7.25 | 10.27 | 13.48 | 16.63 | 19.55 | 22.03 | 25.46 | 32.47 |

TABLE 7

| Temperature ° C. | 399 | 420 | 438 | 459 |
|---|---|---|---|---|
| $CO_2$ Conv. (%) | 4.97 | 6.27 | 9.15 | 11.92 |
| $CH_4$ Conv. (%) | 3.21 | 4.19 | 6.41 | 9.09 |
| CO (%) | 4.13 | 5.27 | 7.84 | 10.51 | a $Ni—ZrO_2$ catalyst still shows considerably better stability behavior at higher temperatures than, for instance, a Ni catalyst on an $AlO_3$ support material, which is clearly deactivated more rapidly.

COMPARATIVE EXAMPLE 1

A traditional Pt catalyst was prepared, in a manner similar to that described in Example 1. Instead of the $ZrO_2$, 5 g of —$Al_2O_3$ were used and worked, in the same manner, into a granular support material of a particle size of 0.3–0.6 mm. This material, with a BET surface of 103 $m^2/g$, had a clearly larger surface and with 0.04 $cm^3/g$ a substantially smaller pore volume. The catalyst coating was produced precisely in the same manner as in the first example and led to a 1 wt. % $Pt/—Al_2O_3$ catalyst. Again under the same experimental conditions as in Example 1, the measured values listed in Table 8 were obtained. They show an activity which, it is true, is higher than that appearing in Table 1 of Example 1 of the invention. The decisive factor, however, is that this traditional catalyst was inactivated within a very short period of time by coking. This can be noted from FIGS. 3, 4 and 5, which indicate the conversion rates for $CO_2$ and $CH_4$ and the CO yield as a function of the temperature for a first and only one second temperature cycle. It results therefrom that this catalyst is practically deactivated, and therefore

TABLE 8

| Temperature °C. | 400 | 421 | 445 | 465 | 489 | 512 | 533 | 555 |
|---|---|---|---|---|---|---|---|---|
| $CO_2$ Conv. (%) | 3.39 | 6.13 | 8.88 | 12.01 | 15.85 | 20.23 | 24.85 | 29.75 |
| $CH_4$ Conv. (%) | 7.39 | 10.13 | 14.63 | 20.56 | 28.17 | 36.95 | 46.53 | 57.09 |
| CO (%) | 4.17 | 6.91 | 10.00 | 13.68 | 18.25 | 23.49 | 29.08 | 35.08 | has become unusable, already after passing through a single temperature cycle up into the temperature range of about 600° C.

COMPARATIVE EXAMPLE 2

A support material of 5 g γ-$Al_2O_3$ having a particle size of 0.3–0.5 mm was first of all prepared in the same manner as in Comparative Example 1. This material was then treated with 10 cc of an aqueous $Ni(NO_3)\times 6H_2O$ solution at 60° C. in a rotary evaporator in order to obtain a 10 wt. % Ni/γ-$Al_2O_3$ catalyst. After the impregnation, the catalyst was dried for 14 hours at 110° C. as in Example 1 and then calcined for 15 hours at 850° C. The results for the $CO_2$ conversion rate, the $CH_4$ conversion rate and the CO yield for the first temperature cycle can be noted from FIG. 6. At temperatures of about 500° C., a drastic deactivation appeared already in this first cycle, so that such a Ni catalyst cannot be used in practical operation.

We claim:

1. A process for making CO/$H_2$-synthesis gas comprising:
   contacting a gas containing one of $CO_2$, $CH_4$, hydrocarbons or mixtures thereof with a catalyst at temperatures of between about 400 and about 900° C., and a pressure of between about 1 and about 30 bar, wherein said catalyst comprises (a) an oxidic support material and (b) a coating comprising between about 0.1 and about 7.0 wt. % of at least one of the metals of the group consisting of Pt, Ni, Pd and Co; said support material comprising:
   (i) at least 80 wt. % of $ZrO_2$ which has been calcined at a temperature up to about 670° C. before the application of said coating;
   (ii) 0.5–10 mol % of at least one oxide selected from the group consisting of Y, La, Al, Ca, Ce and Si, wherein said oxide is mixed with said support material so as to thermally stabilize the support material; said coating having been initially formed as a compound in a solvent, and physically impregnated into said support to result in adsorption of said coating substance as a compound, whereupon said solvent was evaporated and the resulting material calcined at a temperature of no greater than 650° C.

2. The process of claim 1, wherein the gas is contacted with the catalyst at temperatures of between about 700 and 800° C.

3. The process of claim 1, wherein the pressure is between about 10 and 20 bar.

4. The process of claim 1, wherein the gas contains $CO_2$ and $CH_4$.

5. The process of claim 4, wherein the molar weight ratio of $CO_2$ to $CH_4$ is between about 0.5 and 4.

6. The process of claim 4, wherein the molar weigh ratio of $CO_2$ to $CH_4$ is between 0.5 and 1.5.

7. The process of claim 4, wherein the weight ratio of $CO_2$ to $CH_4$ is 1.

* * * * *